US005549842A

United States Patent [19]

Chang

[11] Patent Number: 5,549,842

[45] Date of Patent: Aug. 27, 1996

[54] THICKENED ALKALI METAL HYPOCHLORITE COMPOSITION

[75] Inventor: David L. Chang, Norwalk, Conn.

[73] Assignee: Reckitt & Colman Inc., Montvale, N.J.

[21] Appl. No.: 451,477

[22] Filed: May 26, 1995

Related U.S. Application Data

[63] Continuation of Ser. No. 174,905, Dec. 29, 1993, abandoned.

[51] Int. Cl.$^6$ .......................... C01B 11/04; C01B 11/06; C11D 3/395

[52] U.S. Cl. .............. 510/191; 252/187.24; 252/187.25; 252/187.26; 252/186.36; 510/238; 510/373; 510/490; 510/503

[58] Field of Search ........................ 252/186.36, 187.24, 252/187.25, 187.26, 187.27

[56] References Cited

U.S. PATENT DOCUMENTS

| | | | |
|---|---|---|---|
| 3,560,389 | 2/1971 | Hunting | 252/95 |
| 4,071,463 | 1/1978 | Steinhauer | 252/103 |
| 4,282,109 | 8/1981 | Citrone et al. | 252/102 |
| 4,337,163 | 6/1982 | Schilp | 252/96 |
| 4,388,204 | 6/1983 | Dimond et al. | 252/98 |
| 4,588,514 | 5/1986 | Jones et al. | 252/98 |
| 4,783,283 | 11/1988 | Stoddart | 252/547 |
| 4,824,590 | 4/1989 | Roselle | 252/90 |
| 4,828,748 | 5/1989 | Hoffman | 252/102 |
| 4,900,467 | 2/1990 | Smith | 252/95 |
| 4,952,333 | 8/1990 | Cramer | 252/187 |
| 5,034,150 | 7/1991 | Smith | 252/187 |
| 5,055,219 | 10/1991 | Smith | 252/102 |
| 5,073,286 | 12/1991 | Otten et al. | 252/97 |
| 5,075,027 | 12/1991 | Dixit et al. | 252/174 |
| 5,080,826 | 1/1992 | Colborn et al. | 252/187.25 |
| 5,089,161 | 2/1992 | Ahmed et al. | 252/99 |
| 5,098,590 | 3/1992 | Dixit et al. | 252/99 |
| 5,120,465 | 6/1992 | Sare et al. | 252/174 |
| 5,130,043 | 7/1992 | Prince et al. | 252/95 |
| 5,169,552 | 12/1992 | Wise | 252/95 |
| 5,196,139 | 5/1993 | Moschner | 252/186.25 |
| 5,205,953 | 4/1993 | Dixit | 252/94 |
| 5,227,366 | 7/1993 | Swatling et al. | 512/2 |
| 5,229,027 | 7/1993 | Ahmed | 252/99 |

FOREIGN PATENT DOCUMENTS

| | | |
|---|---|---|
| 0021581 | 1/1981 | European Pat. Off. . |
| 0079697 | 5/1983 | European Pat. Off. . |
| 0137551 | 4/1985 | European Pat. Off. . |
| 0145084 | 6/1985 | European Pat. Off. . |
| 00204472 | 12/1986 | European Pat. Off. . |
| 06184594 | 7/1994 | Japan . |

OTHER PUBLICATIONS

Abstract Only: EP–79–697, Nov. 7, 1981 GB033642.

*Primary Examiner*—Gary Geist
*Assistant Examiner*—Joseph D. Anthony
*Attorney, Agent, or Firm*—Frederick H. Rabin; Andrew N. Parfomak; J. Jeffrey Hawley

[57] ABSTRACT

Thickened aqueous hypochlorite compositions comprises (a) an alkali metal hypochlorite, (b) a tertiary amine oxide with one alkyl group having from 10 to 16 carbon atoms and the two other alkyl groups having from 1 to 3 carbon atoms, (c) an alkali metal salt, (d) a pH stabilizer to bring the pH to a level of 11 or higher, (e) a $C_{10}$–$C_{16}$ alkali metal sarcosinate, and (f) $C_{10}$–$C_{14}$ straight chain alkyl benzene sulfonate. The molar ratio of (b):(f) is from about 5:1 to about 11:1 and is adjusted so that the viscosity of the composition is between 231 and 402 cps. The compositions are useful for general cleaning purposes, particularly bathrooms and toilet bowls, and also as a laundry additive.

18 Claims, No Drawings

THICKENED ALKALI METAL HYPOCHLORITE COMPOSITION

This application is a continuation, of application Ser. No. 08/174,905, filed 29 Dec. 1993, now abandoned.

FIELD OF INVENTION

This invention relates to liquid bleach compositions useful in cleaning and disinfecting.

BACKGROUND OF THE INVENTION

Thickened bleach compositions possess a number of advantages over unthickened bleach compositions. The more viscous, thickened solutions adhere to vertical and inclined surfaces for a longer period of time as compared to the unthickened solutions. Consequently the bleaching or disinfectant activity of the thickened compositions is more effective on the intended areas.

To provide a thickened hypochlorite composition having an acceptable shelf-life, the rate of decomposition of alkali metal hypochlorite as well as the phase behavior of the composition must be considered. As known, alkali metal hypochlorite degradation may be illustrated by the following equation:

$$NaOCl \leftrightharpoons NaCl + \frac{1}{2} O_2$$

Many conventional thickening agents accelerate the degradation of the hypochlorite and thus are problematic for use in hypochlorite compositions. Also, the inclusion of conventional thickening agents and surfactants is difficult because the resulting hypochlorite composition has a tendency to separate into two or more phases, particularly at elevated temperatures. Many thickening agents are themselves unstable in the presence of an alkali metal hypochlorite. Thus, achieving sufficient viscosity in hypochlorite compositions by conventional agents and additives in addition to providing a hypochlorite composition having acceptable stability is difficult.

Alternative hypochlorite compositions providing sufficient viscosity as well as an acceptable shelf-life (i.e. stability) are needed.

SUMMARY OF THE INVENTION

According to the invention, an alternative aqueous hypochlorite composition has been discovered, the composition comprising: (a) from about 0.5 weight % to about 10 weight % of an alkali metal hypochlorite; (b) from about 0.5 weight % to about 2.5 weight % of a tertiary amine oxide of the formula

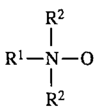

where $R^1$ is an alkyl group containing from about 10 to about 16 carbon atoms and $R^2$ is a lower alkyl group containing from 1 to 3 carbon atoms; (c) an alkali metal salt; (d) a pH stabilizer; (e) from 0 weight % to about 2 weight % of an alkali metal sarcosinate as represented by the formula $RCON(CH_3)CH_2COOM$ where R is a branched or straight chain $C_{10}$–$C_{16}$ alkyl group and M is an alkali metal cation; and (f) from about 0.1 weight % to about 0.8 weight % of an alkali metal $C_{10}$ to $C_{14}$ straight chain alkyl benzene sulfonate, wherein the molar ratio of (b):(f) ranges from about 5:1 to about 11:1 of (b):(f) wherein all weight percentages used herein represent active ingredient weight percentages, based on the total weight of the aqueous composition.

The inventive composition is a hypochlorite stable, single phase, thickened hypochlorite bleach composition capable of adhering to vertical or inclined surfaces longer than thinner compositions. The composition is an effective agent for stain and soil removal as well as disinfection. The high level of hypochlorite stability and single solution phase behavior of the composition enables the composition to have an acceptable shelf life. Thus a commercially valuable thickened bleach composition has been discovered.

DETAILED DESCRIPTION OF INVENTION

Preferably the alkali metal of the alkali metal hypochlorite is selected from lithium, potassium, or sodium. For purposes of cost and availability, sodium hypochlorite is currently preferred. The alkali metal hypochlorite may have other by-products of the manufacturing process present without adversely affecting the composition. The amount of alkali metal hypochlorite employed is preferably within the range of about 0.5 weight % to about 10 weight %, more preferably from about 1 weight % to 5 weight %, and most preferably from 1 weight % to 3 weight %.

The tertiary amine oxide is preferably of the formula:

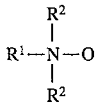

wherein $R^1$ is an alkyl group containing from about 10 to about 16 carbon atoms and $R^2$ is a lower alkyl group containing from about 1 to about 3 carbon atoms. $R^1$ and $R^2$ may be a straight or branched chain which may contain an odd or even number of carbon atoms. Amine oxides of mixed chain length may be used. Such materials may contain a predominance of one or more chain lengths. More preferably, the tertiary amine oxide is selected from myristyldimethyl amine oxide, lauryldimethyl amine oxide, and mixtures thereof. Most preferably employed is myristyldimethyl amine oxide. The amount of the tertiary amine oxide employed is preferably in the range from about 0.5 weight % to about 2.5 weight %, more preferably from 1 weight % to 2.25 weight %, and most preferably from 1.5 weight % to 1.95 weight %.

The alkali metal salt may be selected from any number of water-soluble alkali metal salts and mixtures thereof, with the alkali metal preferably defined as lithium, potassium, or sodium, and the anion ion preferably defined as a halide (such as chloride, fluoride, bromide, iodide, and so on). More preferably, the alkali metal salt is selected from the group consisting of sodium chloride, lithium chloride, potassium chloride, and mixtures thereof. For purposes of cost and availability, the alkali metal salt most favored is sodium chloride and may be used in varying amounts to reduce alkali metal hypochlorite degradation, limited only by the avoidance of a "salting out" of the solution (where the surfactants become insoluble in water). The "salting out" phenomenon is well-known to those skilled in the art, as described, for example, in an article by P. Mukerjee in *J. of Physical Chemistry,* Vol. 69, No. 11, p. 4038 (1965) (hereby incorporated by reference) and references cited therein.

An alkali metal hydroxide is the preferred pH stabilizer included in the composition although any pH stabilizer may be employed as long as the stability and viscosity of the composition are not adversely affected. Other pH stabilizers which may be used, for example, include carbonate buffers. The alkali metal of the preferred hydroxide may be lithium, potassium, or sodium. Sodium hydroxide and potassium hydroxide are particularly useful pH stabilizers due to cost and availability, with sodium hydroxide most preferred. The alkali metal hydroxide is included in the composition in an effective amount to adjust the composition to a pH level of at least about 11, more preferably form 12 to 13.5, and most preferably within the range from 12 to 13.

The alkali metal alkyl sarcosinate may be represented by the formula $RCON(CH_3)CH_2COOM$ wherein R is a branched or straight chain $C_{10}$–$C_{16}$ alkyl group and M is an alkali metal cation (such as lithium, potassium, sodium, and so on). Sodium lauroyl sarcosinate is most preferred. The amount of alkali metal alkyl sarcosinate that may be used preferably ranges from about 0 weight % to about 0.75 weight %, more preferably 0.15 weight % to about 0.45 weight %, and most preferably from 0.15 weight % to 0.3 weight %.

The alkali metal $C_{10}$ to $C_{14}$ straight chain alkyl benzene sulfonate is preferably defined wherein the alkali metal is potassium, lithium, or sodium. Most preferably employed is sodium dodecyl benzene sulfonate. Preferably the amount of sulfonate used is within the range of from about 0.1 weight % to about 0.8 weight %, more preferably from 0.1 weight % to 0.5 weight %, and most preferably from 0.15 weight % to 0.4 weight %.

The molar ratio of the tertiary amine oxide to alkali metal alkyl benzene sulfonate preferably falls within the range of from about 5:1 to about 11:1 of tertiary amine oxide:alkali metal alkyl benzene sulfonate. More preferably, the molar ratio falls between 6:1 to 10:1, and most preferably from 7:1 to 9:1.

The composition offers an improved viscosity for alkali metal hypochlorite bleaches. Although not wishing to be bound to theory, it is believed that the viscosity levels of the inventive composition are achieved by a dual system, where both the presence of the alkali metal alkyl benzene sulfonate as well as the molar ratio of the tertiary amine oxide to sulfonate contribute to increasing the viscosity. Also, the amounts of both the sulfonate and the tertiary amine as previously set forth are believed important in achieving a single solution phase stability. Viscosity as set forth herein is in cps units measurable using a Brookfield SYNCHRO-LECTRIC™ Viscometer Model LVT using a No. 2 spindle at 30 r.p.m. at about 25° C. The viscosity of the composition may be adjusted by varying the amount of sulfonate used as well as by varying the molar ratio of the tertiary amine oxide and alkali metal alkyl benzene sulfonate, depending upon the desired end use. Optimally, viscosities of at least about 20 cps, up to levels of 100 cps and beyond 350 cps may be achieved, as illustrated in the Examples section herein.

According to the invention, the alkali metal hypochlorite composition is not only viscous, but also exhibits an acceptable shelf-life both in terms of retardation of alkali metal hypochlorite degradation and single solution phase behavior. In the inventive composition, the alkali metal hypochlorite degradation has been slowed to render a composition having an alkali metal hypochlorite half-life of at least about 30 days, more preferably at least three months and most preferably at least six months. Further the invention provides a composition exhibiting a single phase solution for a period of at least 30 days, more preferably three months and most preferably at least six months. Hypochlorite degradation may be measured by alkali metal hypochlorite titration over time (which may be accomplished by numerous techniques known to those skilled in the art). Observation of the single solution phase behavior of the composition may be made visually. The high level of stability combined with the high level of viscosity provides for a commercially desirable composition useful as a multipurpose cleaning composition.

The high viscosity characteristic of the composition makes it particularly well-suited for use as a hard surface cleaner and disinfectant, such as, a bathroom cleaner, a toilet bowl cleaner, a mold and mildew cleaner, a laundry additive, and so on. Additional optional ingredients include suitable hypochlorite-stable colorants, perfumes, perfume blends, and so on, as known to those skilled in the art.

Any number of techniques may be employed to prepare the inventive composition, as within the knowledge of one skilled in the art.

The invention is further illustrated in the following non-limitative examples in which weight percentages are by total weight of the final composition unless otherwise indicated.

EXAMPLES

Example 1

Compositions shown in Table I below were prepared by first mixing the sodium chloride, sodium hydroxide, myristyldimethyl amine oxide, fragrance, and sodium hypochlorite with water (approx. 90% of total added water) until ingredients were dissolved. The sodium lauroyl sarcosinate and sodium dodecyl benzene sulfonate were combined in a premix of water (approx. 10% of total added water), then added to the other ingredients, to form the final composition.

As shown below, Compositions A–J represent the invention and were all single phase solutions. Composition K, representing a comparison, was a two phase solution. The formula for Composition K, as shown in Table I was prepared using a molar ratio of 4.4:1, tertiary amine oxide:sodium dodecyl benzene sulfonate (therefore outside the invention).

TABLE I

| Ingredient | A | B | C | D | E | F | G | H | I | J | K |
|---|---|---|---|---|---|---|---|---|---|---|---|
| Water | q.s. | q.s. | q.s. | q.s. | q.s. | q.s. | q.s. | q.s. | q.s. | q.s. | q.s. |
| Sodium chloride | 1 | 1 | 1 | 1 | 1 | 1 | 1 | 1 | 1 | 1 | 1 |
| Sodium Hydroxide[a.] (25%) | 1.4 | 1.4 | 1.4 | 1.4 | 1.4 | 1.4 | 1.4 | 1.4 | 1.4 | 1.4 | 1.4 |
| Myristyidimethylamine oxide[b.] (30%) | 6.2 | 6.2 | 6.2 | 6.2 | 6.2 | 6.2 | 6.2 | 5.6 | 5 | 4 | 3 |
| Sodium hypochlorite[c.] (13.5%) | 18.5 | 18.5 | 18.5 | 18.5 | 18.5 | 18.5 | 18.5 | 18.5 | 18.5 | 18.5 | 18.5 |
| Sodium lauroyl sarcosinate[d.] (30%) | 1 | 1 | 1 | 1 | 1 | 1 | 0.5 | 1 | 1 | 1 | 1 |
| Sodium dodecyl benzene sulfonate[e.] (40%) | 0.6 | 0.8 | 0.3 | 0.45 | 0.75 | 0.9 | 0.75 | 0.7 | 0.7 | 0.7 | 0.7 |
| Fragrance | 0.075 | 0.075 | 0.075 | 0.075 | 0.075 | 0.075 | 0.075 | 0.075 | 0.075 | 0.075 | 0.075 |

TABLE I-continued

| Ingredient | A | B | C | D | E | F | G | H | I | J | K |
|---|---|---|---|---|---|---|---|---|---|---|---|
| Molar Ratio of Amine Oxide:Sulfonate pH ≈ 12.7 (A–K) | 10.5:1 | 7.9:1 | 15:1 | 14:1 | 8.4:1 | 7:1 | 8.4:1 | 8.1:1 | 7.3:1 | 5.8:1 | 4.4:1 |

[a] Active ingredient: A–K = 0.35 weight %.
[b] AMMONYX ™ MO (Supplier: Stepan Company) Active ingredient: A–G = 1.86 weight %; H = 1.68 weight %; I = 1.5 weight %; J = 1.2 weight %; K = 0.9 weight %.
[c] Active ingredient: A–K = 2.5 weight %.
[d] HAMPOSYL ™ L-30 (Supplier: Hampshire Chemical) A–F = 0.3 weight %; G = 0.15 weight %; H–K = 0.3 weight %.
[e] BIOSOFT ™ (Supplier: Stepan Company) A = 0.24 weight %; B = 0.32 weight %; C = 0.12 weight %; D = 0.18 weight %; E = 0.3 weight %; F = 0.36 weight %; G = 0.3 weight %; H–K = 0.28 weight %.

Example II

The viscosity of inventive compositions A–J were measured in cps using a Brookfield SYNCHROLECTRIC™ Viscometer Model LVT using a No. 2 spindle at 30 r.p.m. at about 25° C. Results are summarized in Table II below.

TABLE II

| VISCOSITY READINGS | |
|---|---|
| COMPOSITION | cps |
| A | 260 |
| B | 390 |
| C | 61 |
| D | 144 |
| E | 402 |
| F | 243 |
| G | 333 |
| H | 52 |
| I | 231 |
| J | 116 |

Example III

The stability of Composition A was observed over a period of 51 days, with the composition stored at room temperature. Phase behavior was observed and sodium hypochlorite degradation was measured.

As visually observed, the solution remained as a single phase solution during this period thus indicating phase stability.

The degradation of sodium hypochlorite was measured over time by a titration of the sodium hypochlorite at time intervals summarized in Table III hereinafter. The technique by which the titration was accomplished is described as follows. In step (1) between about 0.4 g to 0.5 g of the composition solution was placed into an Erlenmeyer flask. In step (2), about 40 ml of de-ionized water was added to the flask from step (1) and mixed well. In step (3), about 8 ml of glacial acetic acid was added to the flask from step (2) and mixed well. In step (4), two pellets of potassium iodide (about 0.4 g) were added to the flask from step (3) and mixed well to dissolve whereupon the solution turned a muddy brown color. In step (5), the brown solution from step (4) was titrated with 0.1N sodium thiosulfate ($Na_2S_2O_3$) solution (volumetric solution, reagent grade). The end point was reached when the solution turned colorless. In step (6), the following equation was used to calculate the % of available sodium hypochlorite NaOCl:

$$\%\ NaOCl = \underset{\text{(from step 5)}}{ml\ Na_2S_2O_3} \times \underset{\text{(from step 1)}}{0.3722/g\ of\ sample}$$

The calculated weight % of sodium hypochlorite of Composition A is summarized below in Table III.

TABLE III

| Number of Days | Weight % of Sodium Hypochlorite |
|---|---|
| 0 | 2.6% |
| 7 | 2.5% |
| 14 | 2.4% |
| 23 | 2.4% |
| 31 | 2.3% |
| 44 | 2.2% |
| 51 | 2.1% |

Example IV

The stability of Composition B was observed over a period of 37 days, with the composition stored at room temperature. As visually observed, the solution remained as a single phase solution during this period thus indicating phase stability. The degradation of sodium hypochlorite was measured by the technique described in Example III. Results are summarized in Table IV, below.

TABLE IV

| Number of Days | Weight % of Sodium Hypochlorite |
|---|---|
| 0 | 2.5% |
| 7 | 2.4% |
| 15 | 2.4% |
| 22 | 2.3% |
| 30 | 2.3% |
| 37 | 2.2% |

The invention has been described in detail with particular reference to preferred embodiments thereof, but it will be understood that variations and modifications can be effected within the spirit and scope of the invention.

That which is claimed is:

1. An aqueous hypochlorite composition comprising:

(a) from about 0.5 weight % to about 10 weight % of an alkali metal hypochlorite;

(b) from about 0.5 weight % to about 2.5 weight % of a tertiary amine oxide of the formula:

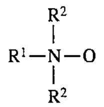

where $R^1$ is an alkyl group containing from about 10 to about 16 carbon atoms and $R^2$ is a lower alkyl group containing from 1 to 3 carbon atoms;

(c) an alkali metal salt;

(d) a pH stabilizer;

(e) from 0.15 weight % to about 0.75 weight % of an alkali metal sarcosinate as represented by the formula $RCON(CH_3)CH_2COOM$ where R is a straight or branched chain $C_{10}$–$C_{16}$ alkyl group and M is an alkali metal cation; and (f) from about 0.1 weight % to about 0.8 weight % of an alkali metal $C_{10}$ to $C_{14}$ straight chain alkyl benzene sulfonate;

wherein the molar ratio of (b):(f) ranges from about 5:1 to about 11:1 and is adjusted so that the viscosity of said composition is between about 231 and 402 cps.

2. A composition according to claim 1 wherein said composition is a single phase solution for a period of at least about 30 days.

3. A composition according to claim 2 wherein:

(a) is sodium hypochlorite;

(b) is selected from the group consisting of myristyldimethyl amine oxide, lauryldimethyl amine oxide, and mixtures thereof;

(c) is sodium chloride;

(d) is an alkali metal hydroxide;

(e) is sodium lauroyl sarcosinate; and (f) is sodium dodecyl benzene sulfonate.

4. A composition according to claim 3 wherein:

(a) is present in an amount ranging from 1 weight % to 5 weight %;

(b) is present in an amount ranging from 1 weight % to 2.25 weight % and is myristyldimethyl amine oxide;

(d) is present in an amount sufficient to adjust the pH level of the composition to about 11 or higher;

(e) is present in an amount ranging from about 0.15 weight % to 0.45 weight %;

(f) is present in an amount ranging from 0.1 weight % to 0.5 weight %; and said molar ratio of (b):(f) is within a range from 6.1 to 10:1.

5. A composition according to claim 4 wherein:

(a) is present in an amount ranging from 1 weight % to 3 weight %;

(b) is present in an amount ranging from 1.5 weight % to 1.95 weight %;

(c) is sodium hydroxide and is present in an amount effective to adjust the pH of the composition to a pH level of from 12 to 13;

(d) is present in an amount ranging from 0.15 weight % to 0.3 weight %;

and said molar ratio of (b):(f) is within a range of 7:1 to 9:1, said viscosity is between about 231 and 402 cps, and the alkali metal hypochlorite half-life is at least about 30 days.

6. An aqueous hypochlorite composition comprising:

(a) from about 0.5 weight % to about 10 weight % of an alkali metal hypochlorite;

(b) from about 0.5 weight % to about 2.5 weight % of a tertiary amine oxide of the formula:

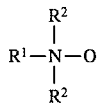

where $R^1$ is an alkyl group containing from about 10 to about 16 carbon atoms and $R^2$ is a lower alkyl group containing from 1 to 3 carbon atoms;

(c) an alkali metal salt;

(d) an alkali metal hydroxide present in an effective amount to adjust the pH level of said composition to at least 11;

(e) from 0.15 weight % to about 0.75 weight % of an alkali metal sarcosinate as represented by the formula $RCON(CH_3)CH_2COOM$ wherein R is a branched or straight chain $C_{10}$–$C_{18}$ alkyl group and M is an alkali metal cation; and (f) from about 0.1 weight % to about 0.8 weight % of a sodium dodecyl benzene sulfonate, wherein the molar ratio of (b):(f) is within the range of from about 5:1 to about 11:1 and is adjusted so that the viscosity of said composition is between about 231 and 402 cps.

7. A composition according to claim 6 wherein the molar ratio of (b):(f) is within the range of from 6:1 to 10:1.

8. A composition according to claim 7 wherein said (f) is employed in an amount ranging from 0.1 weight % to 0.5 weight %.

9. A composition according to claim 8 wherein said viscosity is at least 350 cps.

10. A composition according to claim 9 wherein said composition is a one phase solution for a period of at least about 30 days and the half life of said alkali metal hypochlorite is at least about 30 days.

11. A composition according to claim 10 wherein said composition has a pH level of from 12 to 13.

12. A composition according to claim 11 wherein:

(a) is sodium hypochlorite;

(b) is myristyldimethyl amine oxide;

(c) is sodium chloride;

(d) is sodium hydroxide; and (e) is sodium lauroyl sarcosinate.

13. A bathroom cleaner consisting essentially of:

(a) from about 0.5 weight % to about 10 weight % of an alkali metal hypochlorite;

(b) from about 0.5 weight % to about 2.5 weight % of a tertiary amine oxide of the formula:

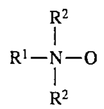

where $R^1$ is an alkyl group containing from about 10 to about 16 carbon atoms and $R^2$ is a lower alkyl group containing from 1 to 3 carbon atoms;

(c) an alkali metal salt;

(d) a pH stabilizer;

(e) from 0.15 weight % to about 0.75 weight % of an alkali metal sarcosinate as represented by the formula $RCON(CH_3)CH_2COOM$ wherein R is a straight chain $C_{10}$–$C_{16}$ alkyl group and M is an alkali metal cation;

(f) from about 0.1 weight % to about 0.8 weight % of an alkali metal $C_{10}$ to $C_{14}$ straight chain alkyl benzene sulfonate; and (g) a hypochlorite-stable fragrance, wherein the molar ratio of (b):(f) ranges from about 5:1 to about 11:1 and is adjusted so that the viscosity of said composition is between about 231 and 402 cps.

14. A bathroom cleaner according to claim 13 wherein:

(a) is sodium hypochlorite;

(b) is myristyldimethyl amine oxide;

(c) is sodium chloride;

(d) is sodium hydroxide;

(e) is sodium lauroyl sarcosinate;

(f) is sodium dodecyl benzene sulfonate.

15. A bathroom cleaner consisting of:

(a) from 1 weight % to 5 weight % of a sodium hypochlorite;

(b) from 1 weight % to about 2.25 weight of a myristyldimethyl amine oxide;

(c) sodium chloride;

(d) an effective amount of sodium hydroxide to adjust said composition to a pH level falling between 12 to 13.5;

(e) from 0.15 weight % to 0.45 weight % sodium lauroyl sarcosinate;

(f) from 0.1 weight % to 0.5 weight % of a sodium dodecyl benzene sulfonate; and (g) a hypochlorite stable fragrance, wherein the molar ratio of (b):(f) ranges from 6:1 to 10:1.

16. A laundry additive consisting essentially of:

(a) from about 0.5 weight % to about 10 weight % of an alkali metal hypochlorite;

(b) from about 0.5 weight % to about 2.5 weight % of a tertiary amine oxide of the formula:

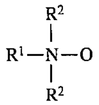

where $R^1$ is an alkyl group containing from about 10 to about 16 carbon atoms and $R^2$ is a lower alkyl group containing from 1 to 3 carbon atoms;

(c) an alkali metal salt;

(d) a pH stabilizer;

(e) from 0.15 weight % to about 0.75 weight % of an alkali metal sarcosinate as represented by the formula $RCON(CH_3)CH_2COOM$ wherein R is a straight or branched chain $C_{10}$–$C_{16}$ alkyl group and M is an alkali metal cation;

(f) from about 0.1 weight % to about 0.8 weight % of an alkali metal $C_{10}$ to $C_{14}$ straight chain alkyl benzene sulfonate; and (g) a hypochlorite-stable fragrance, wherein the molar ratio of (b):(f) ranges from about 5:1 to about 11:1 and is adjusted so that the viscosity of said composition is between about 231 and 402 cps.

17. A toilet bowl cleaner consisting essentially of:

(a) from about 0.5 weight % to about 10 weight % of an alkali metal hypochlorite;

(b) from about 0.5 weight % to about 2.5 weight % of a tertiary amine oxide of the formula:

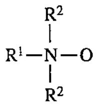

where $R^1$ is an alkyl group containing from about 10 to about 16 carbon atoms and $R^2$ is a lower alkyl group containing from 1 to 3 carbon atoms;

(c) an alkali metal salt;

(d) a pH stabilizer;

(e) from 0.15 weight % to about 0.75 weight % of an alkali metal sarcosinate as represented by the formula $RCON(CH_3)CH_2COOM$ wherein R is a straight or branched chain $C_{10}$–$C_{16}$ alkyl group and M is an alkali metal cation;

(f) from about 0.1 weight % to about 0.8 weight % of an alkali metal $C_{10}$ to $C_{14}$ straight chain alkyl benzene sulfonate; and (g) a hypochlorite-stable fragrance, wherein the molar ratio of (b):(f) ranges from about 5:1 to about 11:1 and is adjusted so that the viscosity of said composition is between about 231 and 402 cps.

18. A toilet bowl cleaner consisting of:

(a) from 1 weight % to 5 weight % of a sodium hypochlorite;

(b) from 1 weight % to about 2.25 weight of a myristyldimethyl amine oxide;

(c) sodium chloride;

(d) an effective amount of sodium hydroxide to adjust said composition to a pH level falling between 12 to 13.5;

(e) from 0.15 weight % to 0.45 weight % sodium lauroyl sarcosinate;

(f) from 0.1 weight % to 0.5 weight % of a sodium dodecyl benzene sulfonate; and (g) a hypochlorite stable fragrance, wherein the molar ratio of (b):(f) ranges from 6:1 to 10:1 and is adjusted so that the viscosity of said composition is between about 231 and 402 cps.

* * * * *